US 6,668,528 B2

(12) United States Patent
Franet et al.

(10) Patent No.: US 6,668,528 B2
(45) Date of Patent: Dec. 30, 2003

(54) MOWER ARRANGEMENT HAVING MULTIPLE MOWING UNITS AND DRIVE SYSTEM THEREFOR

(75) Inventors: Roger Franet, Sarraguemines (FR); Lionel Guiet, Gray (FR); Hubert Defrancq, Guignicourt (FR); Daniel Kem, Moulins (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/134,238

(22) Filed: Apr. 29, 2002

(65) Prior Publication Data
US 2002/0174633 A1 Nov. 28, 2002

(30) Foreign Application Priority Data
Apr. 28, 2001 (DE) .......................................... 101 21 015

(51) Int. Cl.⁷ ............................................... A01B 34/66
(52) U.S. Cl. ............................................................ 56/6
(58) Field of Search ........................ 56/6, 7, 15.2, 14.9, 56/15.5, 15.6, 15.9, 13.6, 13.8, DIG. 6, DIG. 9, DIG. 14, 208

(56) References Cited

U.S. PATENT DOCUMENTS 4,838,013 A * 6/1989 Louet Feisser et al. ...... 56/13.6
5,069,022 A 12/1991 Vandermark ...................... 56/6
5,076,042 A * 12/1991 Koorn et al. ...................... 56/6

FOREIGN PATENT DOCUMENTS

| DE | 200 10 904 U1 | 7/1993 |
| DE | 196 20 071 A | 10/1997 |
| DE | 199 53 380 A1 | 12/1998 |
| EP | 02 14 682 A1 | 4/1985 |
| EP | 0 808 556 A | 11/1997 |

OTHER PUBLICATIONS

CLAAS, High Output Mowing Widths, (no publication date), pp. 22–23.

* cited by examiner

Primary Examiner—Robert E. Pezzuto

(57) ABSTRACT

A mowing arrangement includes three mowing units with which are associated a drive system including transmissions associated with each unit that are alike to the extent that the mowing units may be easily exchanged with one another. Specifically, one of the mowing units has an angle drive transmission while the transmissions on the other two mowing units are belt or chain drive transmissions. All transmissions are mounted for easy replacement whereby the angle drive transmission may be replaced by a belt or chain drive transmission like the other mowing units if it is desired to use the front mowing unit as a side mowing unit. A drive system variant includes two angle gear boxes used as a power-receiving transmission, with the result that all of the mowing units can be constructed exactly the same.

12 Claims, 3 Drawing Sheets

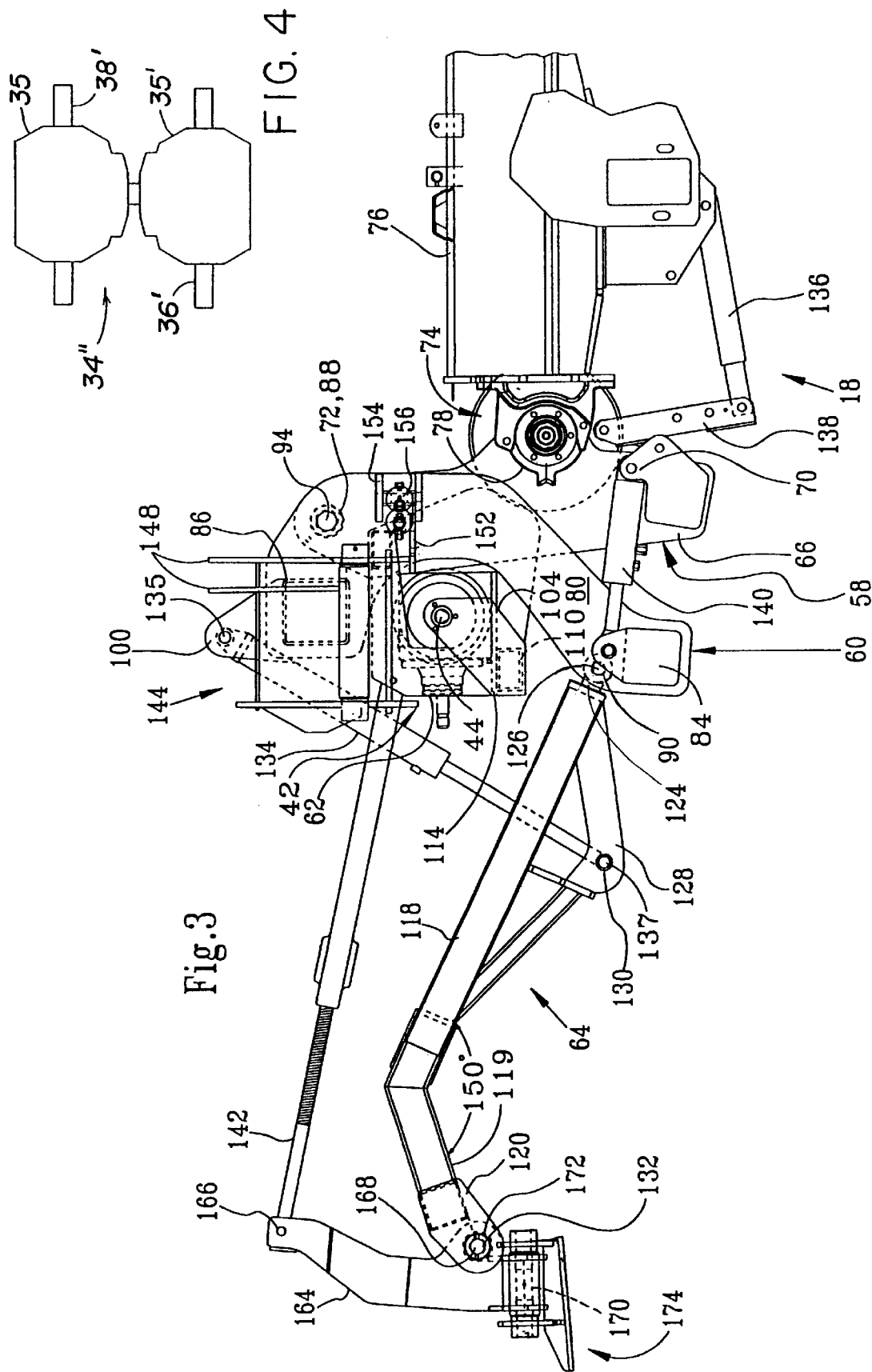

MOWER ARRANGEMENT HAVING MULTIPLE MOWING UNITS AND DRIVE SYSTEM THEREFOR

FIELD OF THE INVENTION

The invention concerns a drive system of a mowing arrangement including at least two mowing units.

BACKGROUND OF THE INVENTION

It is known practice to fasten three mowing units to a common carrier and to connect these to a self-propelled forage harvester. (CLAAS, High Output Mowing Widths, No publication date). Each mowing unit is provided with a belt drive transmission on the side in the region of the center of the vehicle through which a mowing head and, if available, a crop processing arrangement can be driven. The transmissions of each mowing unit are configured and arranged individually.

The problem underlying the invention is seen in the fact that the known configuration of a drive system leads to high costs and that an interchangeability of the mowing units in case of damage cannot be attained in practice.

SUMMARY OF THE INVENTION

According to the present invention there is provided an improved drive arrangement for multiple mower units.

An object of the invention is to provide a drive arrangement for multiple mower units constructed such that at least two of the mowing units have identical transmission arrangements whereby the two mowing units can be exchanged without changing the transmission.

A more specific object of the invention is to provide a drive arrangement, as set forth in the previous object, wherein the traction unit carries a main transmission which is coupled to power-receiving transmissions of the mowing units by telescopic shafts, which permit the mowing units to move relative to the main transmission.

Yet another object of the invention is to provide a drive arrangement for right- and left-hand mower units wherein the power-receiving transmission of each mower unit is provided with an input shaft which may be driven from either end thus permitting either mower unit to be mounted on either side of the traction unit.

Another object of the invention is to provide a mowing arrangement wherein the configuration of one, several or all transmissions as pivoting transmissions, for example, constructed with two angle drive gear boxes that can be pivoted about an axis relative to each other, with the advantage that the power-receiving transmission can be configured the same for all mowing units, since the input shaft can be oriented to the position of the main transmission.

A further object of the invention is to releasably mount the main transmission to a carrier part that is repositioned with changes in the operating height of the mowing units, but that can be repositioned with respect to these and thereby is not moved, for example, during the positioning of the cutting angle, whereby the changes in the spacing and the angle between the associated input and output shafts are held to a minimum.

These and other objects will become apparent from a reading of the ensuing description together with the appended drawings.

BRIEF DESCRIPTION OF THE DRAWINGS

FIG. 3 is a left side view of a part of the framework for supporting the mowing units.

FIG. 4 is a rear view of an alternative embodiment of the further transmission as it appears applied to the left mowing unit.

DESCRIPTION OF THE PREFERRED EMBODIMENT

Figure 1:
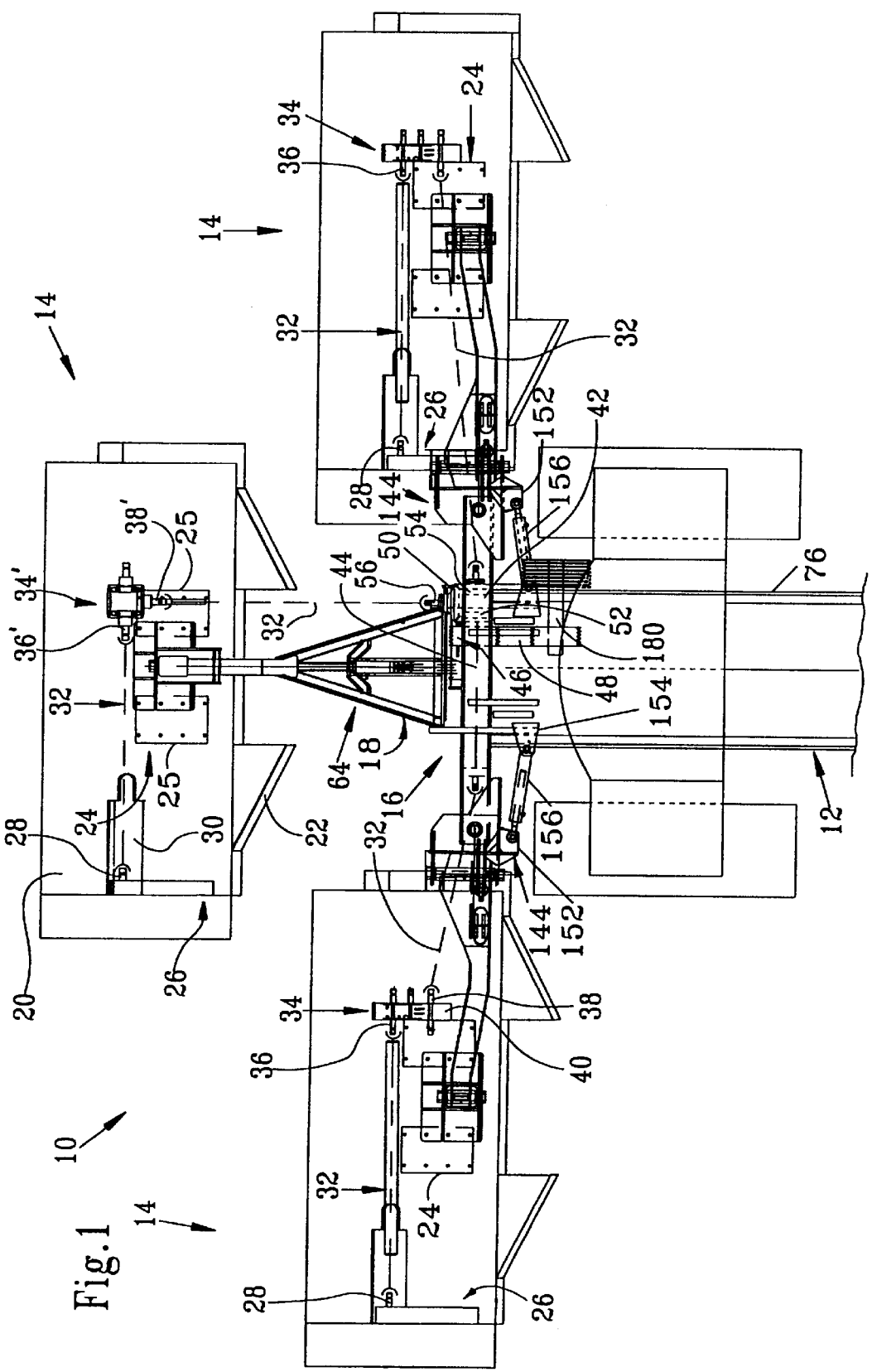
FIG. 1 is a plan view of a mowing arrangement mounted to a front end of a traction unit.

Referring now to FIG. 1, there is shown a mowing arrangement 10 constructed according to the invention and including a carrier vehicle or traction unit 12 having a main frame 76 to the front end of which several mowing units 14 are mounted through the agency of a common carrier frame 16.

The mowing arrangement 10 is used for the mowing of grass or other crops and having a width of cut during operation of, for example, 9 meters, which lies considerably above the width allowed for the transport of implements on public roads. For transport on public roads the mowing arrangement 10 is brought to a width of 3 meters maximum, as is described below.

The carrier vehicle 12 can be configured as an agricultural tractor with a front power lift or with a transmission and seat designed for reverse operating arrangement. But, the carrier vehicle 12 can also be a forage harvester, a combine or a self-propelled vehicle configured especially for mowing or others. In the embodiment illustrated, the carrier vehicle 12 is a self-propelled forage harvester with a front lifting arrangement 18 and a configuration that is known from a forage harvester of the John Deere Company.

The mowing units 14 are configured nearly identically and kept in the form of a known front mowing head. In a manner not shown, each mowing unit 14 is equipped with a mowing head that may be configured, for example, as a disk mowing head, drum mowing head or as a cutter bar. If desired, the mowing head can be followed downstream by a processing arrangement, for example, a stalk crimping or conditioning arrangement or the like. In any case, each mowing unit 14 includes a housing 20, a rear swath-forming arrangement 22, a flange region 24 and a power-distributing transmission 26.

The housing 20 is generally configured in a known manner and consists of a bolted or welded assembly of sheet metal plates and tubes, that is surrounded at its sides by plastic skirts and forms a rigid top cover.

The swath-forming arrangement 22 delivers the mowed and, if necessary, processed crop on the ground at the rear of the mowing unit 14, and consists in the simplest case of converging swath boards oriented vertically. In an embodiment, not shown, in place of the swath boards, a transport belt, a transport screw conveyor or the like is provided, that deposit the crop in a swath or windrow on the ground centrally or offset to the side of the mowing unit 14.

The flange region 24 is located as close as possible to the center of gravity of the mowing unit 14 and can be provided with threaded bores, snap closures, hook closures or the like. In the embodiment shown, the flange region 24 is formed by two identical, equally large, transversely spaced, rectangular flanges 25. Each flange 25 has the same hole pattern of eight threaded holes.

In the present embodiment, the transmission 26 is located, in each case, on the left side of the mowing unit 14 as seen in the direction of operation, and is used to drive the mowing head and any processing or conditioning arrangement that may be present. For this purpose, the transmission 26 is provided with an input shaft 28 of a power transfer arrangement including pulleys or sprockets connected by tensioned flexible drive elements, not shown, for example, a belt or a chain. A recess 30 is provided ahead of the input shaft 28 for an articulated shaft 32, where the recess 30 need not be mandatory.

Spaced toward the opposite side of the housing 20 from the transmission 26 is a further or power-receiving transmission 34 (side mowing units 14) or 34' (central front mowing unit 14) that includes an output shaft 36 (side mowing units 14) or 36' (central front mowing unit 14) and an input shaft 38 (side mowing units 14) or 38' (central front mowing unit 14). This further transmission 34 or 34' is located off center with respect to the direction of operation of the mowing unit 14 and, in this embodiment, is also fastened, so as to be removable, to the right-hand flange 25 of the flange region 24, which, however, is not mandatory. The further transmission 34' that is mounted on the central front mowing unit 14 is configured as an angle drive transmission, and the further transmission 34 on the side or wing mowing units 14 is a spur gear drive or a belt drive transmission.

The input shaft 38 of the further transmission 34, of each of the side or wing mowing units 14, extends through a transmission housing 40 and provides on both sides a stub shaft that engages the associated articulated shaft 32. In lieu of the power-receiving or further transmission 34, it may, from a purely technical standpoint, be possible instead to use a transmission 34", as shown in FIG. 4, where two angle drive gear boxes 35 and 35' are connected to each other so as to pivot relative to each other about an upright axis, in which an input shaft 38' is located in the upper gear box 35 and an output shaft 36' is located in the lower gear box 35'. Thus, the shafts 36' and 38' can assume any desired angular position relative to each other. In any case the output shaft 36' is connected, although it may be disconnected, over the articulated shaft 32, with the input shaft 28 of the transmission 26. In this embodiment, the output shaft 36 is located in the same plane on each mowing unit as the input shaft 28 of the transmission 26, as seen transverse to the direction of mowing. Although their vertical alignment is desired, the present embodiment nevertheless provides a small vertical offset, where the inclination of the articulated shaft 32 is made possible since it enters the recess 30.

In the further transmission 34' of the central or front mowing unit 14, the input shaft 38' extends perpendicular to the output shaft 36'.

In, on, or at the carrier frame 16, there is a main drive transmission 42 which is arranged as an angle drive transmission in T-configuration. The main drive transmission 42 is penetrated by a shaft 44, that operates as an input as well as an output shaft. A drive pulley 46 of a belt drive transmission 48, leading to a power source of the carrier vehicle 12, is fixedly mounted on the shaft 44 for rotation with it. A gear 52, configured as a bevel gear, is mounted, fixed against rotation, on the shaft 44 in a transmission housing 50, which meshes with a gear 54 also configured as a bevel gear arranged at a right angle to it. The gear 54 is mounted on an output shaft 56, which extends at a right angle to the shaft 44 and is coupled, by the flexible shaft 32, to the input shaft 38' of the further transmission 34 of the forward mowing unit 14. The two angle drive transmissions 34' and 42 may be configured equally so that the input shaft 38' of the transmission 34' would become the input shaft and the output shaft 56 of the transmission 42 would become the input shaft if the transmissions 34' and 42 were exchanged.

All input shafts 38 or 38', output shafts 36, 36' or 56, and shafts 44 are provided with a splined profile, that is not shown but is standard, on which a commercially available articulated shaft 32 can be mounted. In the embodiment shown, in the operating position of the mowing units 14, the shaft 44 that extends transverse to the direction of mowing and the input shafts 38, as well as the output shafts 36 and the input shafts 28, extend in one alignment. On the other hand, the output shaft 56 of the main drive transmission 42 is offset to the side of the input shaft 38' of the further transmission 34' that is configured as an angle drive transmission. In general, an offset of the connecting points is possible within the limits existing for each of the articulated shafts 32 used. If necessary, wide angle joints or several articulated shafts can be used that extend at an angle to each other and that are arranged one behind the other, that are connected to each other, fixed against rotation, over a bearing, not shown, in the flange regions.

Deviating from the above description, the drive of each of the mowing units 14 could also be performed over one or more hydraulic or electric motors whereby individual transmissions or all transmissions 26, 34, 34', 34", 42 could be omitted.

On the basis of the above description the result is the following drive concept, where the assumption is that three mowing units 14 are used.

The drive is transmitted from the carrier vehicle 12 over the belt drive transmission 48 to the drive gear 46, which brings the shaft 44 into rotation. The shaft 44 is connected on both sides of the transmission housing 50, fixed against rotation, over one articulated shaft 32 each with the input shaft 38 of the further transmission 34, where, with the left mowing unit 14, an exposed end section of the input shaft 38 projecting from the right side of the transmission housing 40 is connected to the associated shaft 32, and, where, with the right mowing unit 14, an exposed end section of the input shaft 38 projecting from the left side of the transmission housing 40 is connected to the associated shaft 32. Within the further transmission 34 configured as a spur gear or belt drive transmission, the drive is transmitted further to each of the output shafts 36, if necessary with a step up or reduction in speed, which in turn is connected, fixed against rotation, over an articulated shaft 32 with the input shaft 28 of the transmission 26. The transmission 26 finally transmits the drive to the particular mowing head and, if available, processing or conditioning arrangement. Accordingly the drive of the mowing units 14 at the sides is performed, or its drive, in case only one mowing unit 14 at the side is used, without the main drive transmission 42 becoming loaded since the shaft 44 extends completely through the transmission housing 50, which serves in the nature of a bearing support for the shaft 44. The drive of the central, forward mowing unit 14 originates from the shaft 44 or the gear 52 fastened to it, which drives the output shaft 56 through the positive locking connection with the gear 54. The output shaft 56 is connected, fixed against rotation, over the associated articulated shaft 32 with the input shaft 38' of the further transmission 34' on the forward mowing unit 14. A further articulated shaft 32 connects the output shaft 36' of the further transmission 34' with the input shaft 28 of the transmission 26, so that thereby the drive of the mowing head and, if available, of the processing or conditioning arrangement, is guaranteed.

The layout of the transmission 26 as a belt drive transmission with belts permits, on the one hand, a guarantee of the drive train against overloads and, on the other hand, makes it possible to interrupt the drive of every mowing unit 14 independently of any other mowing unit 14.

Beyond that, the arrangement and configuration of the further transmissions 34 or 34" makes it possible to replace a damaged mowing unit 14 by another, for example, of the existing combination. An exchange of the mowing units 14 at the sides is possible without any change. An exchange of the forward mowing unit 14 for one on the side is possible, provided the further transmission 34" configured as an angle drive transmission is exchanged for the further transmission 34 configured as a spur gear drive or belt drive transmission or vice versa, which is possible without any problem due to the method of arrangement and fastening. This ability to exchange mowing units without any problem makes it possible to react rapidly to any damage to a mowing unit 14, so that a mowing unit 14 ready to be applied is always available, and is located ahead of the carrier vehicle 12. The separation of the mowing unit 14 from the carrier 16 is performed in the flange region 24 by means of bolts, screws, hooks or the like, not shown.

Figure 2:
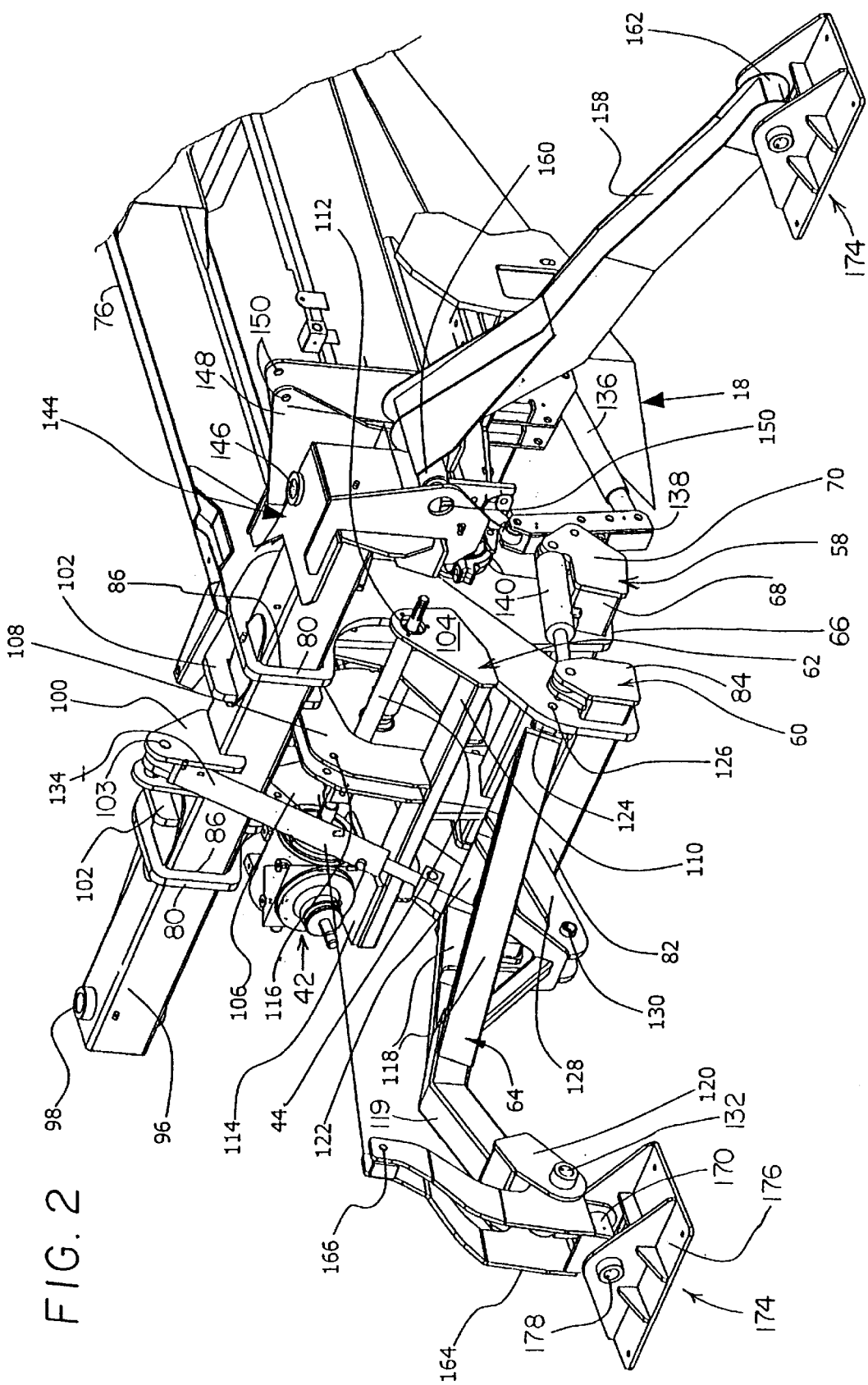
FIG. 2 is a perspective, left front view of a part of the framework for supporting the mowing units.

Referring now to FIGS. 2 and 3, it can be seen that the carrier 16 is composed of several components, in particular, a first carrier part 58, a second carrier part 60, a third carrier part 62 and a fourth carrier part 64, which are carried by the carrier vehicle 12 and can be repositioned in height relative to the ground by its lifting arrangement 18. The carrier 16 forms a unit with the mowing units 14, that can be deposited on the ground or can be transported by the carrier vehicle 12.

The first carrier part 58 includes two plates 66, that are spaced transversely at a distance from each other and joined together by a tube 68, of rectangular or square cross section, so as to be connected rigidly. The tube 68 extends to the side beyond the plates 66 and is provided with a connection 70. The connection 70 is configured in the form of a fork and is provided with an opening, not described in any further detail, that accepts a pin. As can be best seen in FIG. 3, each plate 66 is provided in its upper end region with a bearing bore 72 and on its rear side in its lower half with a bearing 74 that is mounted to a forward end of a frame 76 of the carrier vehicle 12 in bearing shells 78 that can be separated so as to pivot vertically. If the bearing shells 78 are separated, the entire carrier 16 can be released from the carrier vehicle 12 and replaced, for example, by a chopper assembly. The bearing 74 is used simultaneously as a bearing support for a shaft of the belt drive transmission 48 that is parallel to the shaft 44 on the carrier vehicle 12.

The second carrier part 60, as seen in the side view from the left, has the shape of the upper part of a question mark. The carrier part 60 also includes two plates 80 that are transversely spaced from each other and joined together in their lower end regions by a tube 82, of rectangular or square cross section, that projects beyond these to the side and is provided at its ends with a connection 84. The connection 84 is configured as a fork and includes a bore at its upper end for receiving a pin. Each plate 80 is provided in its upper end region with a four-sided opening, in particular a square opening 86. Located in the upper end region of each plate 80 at a location behind the square opening 86 is an upper bearing bore 88, and located in its lower end region beside the connection 84 is a lower bearing bore 90.

In the assembled condition, the first and the second carrier parts 58 and 60 assume relative positions in which the plates 80 of the second carrier part 60 are located outside the plates 66 of the first carrier part 58, but are spaced from this by the smallest possible distance. The bearing bores 72 and 88 are axially aligned and receive a bearing pin 94, so that the first and the second carrier part 58, 60 are connected with each other in a joint, and open and close like a pair of scissors.

Beyond that, as can best be seen in FIG. 2, the second carrier part 60 contains a transverse beam 96 that extends through the openings 86 in, and is connected rigidly, as by welding, with, the plates 80.

The transverse beam 96 is configured as a steel tube with a square cross section that extends close to the side edges of the carrier vehicle frame 76. In each of the outer end regions of the beam 96, a bearing eye 98 is provided that defines an at least generally vertical pivot axis. In the center of the transverse beam 96, and on its upper side, a fork 100 is located that contains bores 103. On the rear side of the transverse beam 96 two ribs 102 are attached that are oriented vertically, that extend parallel to the plates 80 and maintain a spacing to these, so that they take up the plates 66 of the first carrier part 58 in the intervening free space and aid in carrying the bearing pin 94. By reason of the connection of the transverse beam 96 with the plates 80, the transverse beam 96 follows every pivoting movement of the second carrier part 60.

The third carrier part 62 has approximately the shape of a box with pairs of left plates 104, right plates 106 and central plates 108 all of which extend parallel to each other and are rigidly connected, in particular welded, to each other by means of a forward lower tube or bar 110 and a rear upper tube or bar 111 (FIG. 3). Each of the inner plates of the left and the right plates 104 and 106 are bolted to the inner side of the plates 80 of the second carrier part 60. Each of the outer plates of the left and the right plates 104 and 106 are located opposite the outer side of the plates 80 and are provided with a bearing 112 that receives the shaft 44. A horizontal plate 114 is welded to the inner side of the inner one of the right plates 106 and to the bar 110, that is primarily used for the releasable take-up of the main drive transmission 42. The central plates 108 are configured generally as a ring that leaves an interior space through which the shaft 44 can extend. This is not mandatory; rather these plates 108 could also be configured as full surface plates and be equipped with a bearing for the shaft 44. The central plates 108 are spaced at a distance to each other and are provided with bores 116 in a forward upper corner region. By reason of the connection of the third carrier part 62 with the second carrier part 60, the third carrier part 62 follows the pivoting movement of the second carrier part 60.

The fourth carrier part 64 takes the form of a gallows and is approximately triangular in shape as viewed in plan view. Thus, the fourth carrier part 64 includes two forwardly converging, equal legs 118 spaced at a large distance from each other at the rear end and joined by a transverse third leg, that adjoins the second carrier part 60. A stem 119 is joined to the legs 118 in their converging forward end region, the stem 119 having a fork 120 defined at its free end. In side view, it can be seen that the stem 119 of the fourth carrier part 64 is angled such that it forms an included angle of approximately 150° with the legs 118. The third leg 122 extends parallel to the bar 110 and tube 82 in the installed condition. In each of the end regions of the third leg 122, an ear or bracket 124 is located that contains a bore, not described in any further detail. In the installed condition of the fourth carrier part 64, the bore of the bracket 124 is axially aligned with the bore 90, with a pin 126 being received in the aligned bores. Joined to, as by welding, and projecting downward from a central region of the third leg 122 from inside locations along the lengths of the legs 118 and from the bottom of the stem 119, is a support angle 128 that is in the form of a weldment constructed of sheet metal components, not described in any further detail. A bore 130 (FIG. 2) is provided in the corner region of the support angle 128. The fork 120 is provided with a bore 132 that extends transverse to the length of the fourth carrier part 64.

As stated above, the fourth carrier part 64 is connected with the second carrier part 60 by the pins 126, which are inserted through the bore 90 in each of the plates 80 and the associated bore in the connecting parts 124. A first positioning device 134, that may be configured as a threaded spindle, such as a turnbuckle, or as a motor, in particular, a hydraulic motor, as illustrated, is fastened at one end by a pin 135 in the fork 100 on the second carrier part 60 and at its other end by means of a pin 137 in the bores 130 on the fourth carrier part 64.

The repositioning of the carrier 16 relative to the carrier vehicle 12 is performed by means of the lifting arrangement 18 including a second positioning device 136, preferably in the form of a hydraulic cylinder and a pivot arm 138, that can pivot at one end about a horizontal axis extending in the transverse direction on the frame 76 and is loaded at its other end by the second positioning device 136, or is connected with it. The first carrier part 58 is not connected directly with the pivot arm 138 or with the second positioning device 136, but is merely in contact with these. An extension of the second positioning device 136 brings about a pivoting movement of the entire carrier 16 about the pivot axis of the bearing 74 in the clockwise direction as seen in FIG. 3. An unloading of the second positioning device 136 leads to an opposite pivoting movement of the carrier 16 on the basis of the force of its gravity.

A third positioning device 140, also preferably configured as a single acting hydraulic motor, extends between the connection 70 on the first carrier part 58 and the connection 84 on the second carrier part 60 and is secured in each of these by pins in its end regions.

Finally a fourth positioning device 142 (FIG. 3) is provided that can be secured with its rear end region by means of a pin, not shown, that penetrates the bores 116 of the central plates 108. In its simplest form, the fourth positioning device 142 can be configured as a chain, a strut or some other component of invariable length. However, as shown in FIG. 3, the device 142 is a variable length turnbuckle, but can also be configured as a hydraulic cylinder.

While only the left end assembly is shown in FIG. 2, at each of the ends of the transverse beam 96 a universal joint carrier 144 is provided that is composed of two U-shaped components, where each of the U-shaped parts coincide in their bottom region and are indexed by 90 degrees to each other. An inner region facing the transverse beam 96 reaches over the end region of the transverse beam 96 with its U-shape, where the "U" is open in the horizontal direction. The legs are provided with a bearing 146 with a vertical bearing axis in the installed condition that coincides with the axis of the bearing eyes 98, whereby a pin, not shown, can be installed that penetrates the bearing 146 and the bearing eyes 98. The region facing away from the transverse beam 96 represents the second "U", that is open in the vertical direction and is provided with legs 148, that are provided with bores 150 aligned with each other, through which a horizontal axis extends. One end of a hydraulic, mowing unit lift cylinder (not shown) would be attached here while its other end would be attached to a pair of legs (visible only in FIG. 1) provided on a mower unit support arm 158, described below. On the outside of the rear leg 148, a fork 152 is located that is positioned at the same height as a fork 154 on the outside of the plates 80 of the second carrier part 60.

A fifth positioning device 156 has its opposite ends respectively (retained in one of the forks 152 and 154, free to pivot, and is configured in particular as a double acting hydraulic motor.

An arm 158 for each sideways mowing unit 14 in the form of a tube or tube end in a weldment that is approximately half as long as the width of a mowing unit 14 is provided at one end with an inner bearing eye 160 and at its other end with an outer bearing eye 162 whose pivot axes extend parallel to each other and that contain, for example, a welded tube as a bearing surface.

An arm 164 for the forward central mowing unit 14 is also configured as a tube or a weldment and is provided with upper, central and lower bearing eyes 166, 168 and 170, respectively, where the pivot axes extending through the upper and the central bearing eyes 166 and 168 are parallel to each other and in the installed condition of the arms 164 also extend parallel to a pivot axis extending through horizontal bores 132 in the fork 120. The upper bearing eye 166 is located in the uppermost end region of the arm 164 and the central bearing eye is located near the lower end region of the arm 164. The lower bearing eye 170 is located in the lower end region of the arm 164 and is provided with a pivot axis generally extending horizontally that is indexed through 90 degrees relative to the pivot axes of the upper and central bearing eyes 166 and 168, respectively. As viewed from the front, the upper end region of the arm 164 is offset to the right side from the rest by almost the width of the arm 164. The upper bearing eye 166 is used for the connection with the fourth positioning device 142, and the central bearing eye 168 is connected to the fork 120, in each case by means of corresponding pins.

Finally, connecting consoles 174 are provided, each of which contains a plate 176 and a bearing eye 178. In the preferred embodiment, the connecting consoles 174 for all mowing units 14 are identical and are inserted between each of the arms 158 or 164 and each of the mowing units 14. The plate 176 is rigidly connected with the bearing eye 178, in particular welded, and is provided with a hole pattern that conforms to a hole pattern in the flange region 24. The bearing eye 178 is configured in such a way that it can be connected by corresponding pins with the bearing eye 162 or 170, where the pivot axes extend in the direction of mowing of the mowing arrangement 10.

On the basis of the above description, the mowing arrangement 10 is assembled in such a way, and is attached to the carrier 16 in such a way, that each mowing unit 14 with its flange region 24 is connected initially with the connecting console 174 together with the corresponding arms 158 and 164. The arms 158 and 164 are, in turn, connected together with the fourth carrier part 64 or the transverse beam 96 of the second carrier part 60, the second carrier part 60 with the first carrier part 58 and the first carrier part 58 with the frame 76.

In order to reach each of the positions of the carrier parts 58 through 64 and the mowing units 14 fastened thereto, the positioning devices 134, 136, 140, 142 and 156 are assembled correspondingly and, as far as necessary, connected to a corresponding positioning system, for example, a hydraulic system, in particular, that of the carrier vehicle 12.

Finally the main drive transmission 42 is mounted on the third carrier part 62 and the drive connections according to the above description are established by the articulated shafts 32 and connected with a drive, not shown, on the carrier vehicle 12 that may be transmitted over a countershaft 180 (FIG. 1) to the belt drive transmission 48. It is clear then that vertical adjustments of the mowing units 14 by virtue of operation of the lifting device 18 results in the main drive transmission 42 moving with them, thus keeping the angles of the articulated shafts within desirable limits.

Further, it will be appreciated, that because the main transmission 42 and the further transmission 34' of the front mowing unit are offset relative to the fourth carrier part 64, no collision of the drive shaft 32 will occur during vertical movements of the carrier part 64.

Having described the preferred embodiment, it will become apparent that various modifications can be made without departing from the scope of the invention as defined in the accompanying claims.

What is claimed is:

1. In a mowing arrangement including a carrier vehicle having a main frame, at least two mowing units, each of which is mounted to said main frame for selective movement between a lowered working position, wherein an associated mowing head is disposed for mowing operation, and an an elevated transport position, wherein each mowing unit is completely supported by said main frame, each mowing unit being provided with a transmission arrangement for driving said associated mowing head, and a main transmission carried by said carrier vehicle and coupled to each transmission arrangement for supplying power for driving the mowing heads of said at least two mowing units, the improvement comprising: each transmission arrangement including a power-distributing transmission, with the power-distributing transmissions being similar and arranged identically on each mowing unit.

2. The mowing arrangement, as defined in claim 1, wherein each transmission arrangement further includes a power-receiving transmission having a power-receiving input shaft coupled to said main transmission and a power-receiving output shaft coupled to said power-distributing transmission; and said mowing units having substantially identical flange regions located similarly on each mowing unit; said power-receiving transmission of each mowing unit being mounted to an associated flange region and coupled for receiving power from said main transmission; and a drive shaft being coupled between each power-receiving transmission and an input shaft of said power-distributing transmission.

3. The mowing arrangement, as defined in claim 2, wherein said power-receiving transmission includes a power-receiving input shaft having opposite ends for being selectively coupled to said main transmission depending on the relative positioning of the associated mowing unit to said main transmission.

4. The mowing arrangement, as defined in claim 1, wherein a mowing unit carrier frame is releasably mounted to said main frame; said main transmission being mounted to said carrier frame; and an arm being coupled between each mowing unit and said carrier frame, with releasable couplings being made with said mowing units, whereby said carrier frame may be disconnected from said mowing units while remaining coupled to said main frame, or said carrier frame may be disconnected from said main frame while remaining connected to said cutting units.

5. The mowing arrangement, as defined in claim 4, wherein said carrier frame is mounted to said main frame for being moved up and down; and an actuator arrangement being coupled between the main frame and the carrier frame for selectively causing up and down movement, whereby said mowing units are moved together with said carrier frame.

6. The mowing arrangement, as defined in claim 1, wherein said main transmission includes a main transverse drive shaft; said mowing units including first and second side mowing units respectively located outwardly from opposite ends of said main transverse drive shaft; said transmission arrangement of said first and second side mowing units each including a power-receiving transmission having a power receiving input shaft; said power-receiving inputs of said first and second side mowing units being respectively coupled to said opposite ends of said main transverse shaft; and said main transverse shaft being adapted for receiving power from a primary power source.

7. The mowing arrangement, as defined in claim 1, wherein said main transmission includes a gear housing that is arranged off center on said carrier frame relative to a longitudinal center line of said main frame and including a forwardly projecting main transmission output shaft; said plurality of mowing units including a front mowing unit centered transversely on said longitudinal center line; said transmission arrangement of said front mowing unit including a power-receiving transmission having a power-receiving input shaft located in substantial fore-and-aft alignment with, and coupled to, said output shaft of said main transmission.

8. The mowing arrangement, as defined in claim 2, wherein said output shaft of said power-receiving transmission is coupled to an input shaft of said power-distributing transmission by an articulated drive shaft.

9. The mowing arrangement, as defined in claim 1, wherein said power-distributing transmissions are belt drive transmissions that can be turned off.

10. The mowing arrangement, as defined in claim 2, wherein said power-receiving transmissions are one of spur gear or belt drive transmissions.

11. The mowing arrangement, as defined in claim 10, wherein three mowing units are coupled to said carrier frame, with one being a front mowing unit and the other two being right and left side mowing units; said right side and left side mowing units being identical and their power-receiving transmissions being belt transmissions; and said front mowing unit differing from said right and left mowing units in that its power-receiving transmission is in an angled gear transmission.

12. The mowing arrangement, as defined in claim 2, wherein said power-receiving transmission of each mowing unit includes first and second angle gear boxes connected together for pivoting relative to one another; said first angle gear box having an input shaft connected to said main transmission; and said second angle gear box having an output shaft coupled to said power-distributing transmission.

* * * * *